Nov. 18, 1952 H. L. KNUDSEN 2,618,252
FUEL FEEDING AND DISTRIBUTING APPARATUS
FOR INTERNAL-COMBUSTION ENGINES
Filed May 24, 1947 7 Sheets-Sheet 4

Inventor:-
Hans L. Knudsen,
By Davis, Lindsey, Smith & Shonts
Atty's.

Fig. 16.

Inventor:—
Hans L. Knudsen.
By Davis, Lindsey, Smith + Shonts
Attys.

Patented Nov. 18, 1952

2,618,252

UNITED STATES PATENT OFFICE 2,618,252

FUEL FEEDING AND DISTRIBUTING APPARATUS FOR INTERNAL - COMBUSTION ENGINES

Hans L. Knudsen, Columbus, Ind., assignor to Cummins Engine Company, Inc., Columbus, Ind., a corporation of Indiana Application May 24, 1947, Serial No. 750,250

7 Claims. (Cl. 123—140)

My invention relates to fuel feeding and distributing apparatus for internal combustion engines and more particularly to devices of this character which are arranged for the handling of liquid fuel and its positive discharge in desired, equal quantities to a plurality of engine cylinders.

The present apparatus is of the same general type as that disclosed in United States Letters Patent No. 2,001,126, dated May 14, 1935, as regards the association of an injector for engine cylinders for forcibly delivering measured quantities of fuel thereto, a fuel or metering pump common to all injectors, and a charging pump for delivering the liquid fuel under pressure to the metering pump. Accordingly, the invention disclosed herein is characterized by the same operating advantages in respect of a positive, mechanical and so-called two-stage handling of the fuel, i. e., a feeding of measured and equal charges of the fuel at relatively low pressure to the several injectors by the fuel pump, and a delivery of these charges by the injectors into the engine cylinders against the much higher compression pressures obtaining therein.

The principal object of the present invention is to provide a fuel feeding and distributing apparatus for internal combustion engines in which metering of the fuel charges to the injector lines is controlled by a hydraulic isochronous governor throughout all or a portion of the working range of the engine.

A further object is to devise an apparatus of the character indicated wherein the hydraulic pressure for the governor is derived from the pressure in the fuel line leading to the metering pump.

A further object is the provision of a compact and light metering and distributing apparatus in which all elements thereof, including the governor control, are contained within a single housing, thus providing a self-contained unit which may be mounted on the engine in a completely assembled condition.

These and further objects of my invention will be set forth in the following specification, reference being had to the accompanying drawings, and the novel means by which said objects are effectuated will be definitely pointed out in the claims.

Figures 1, 2:
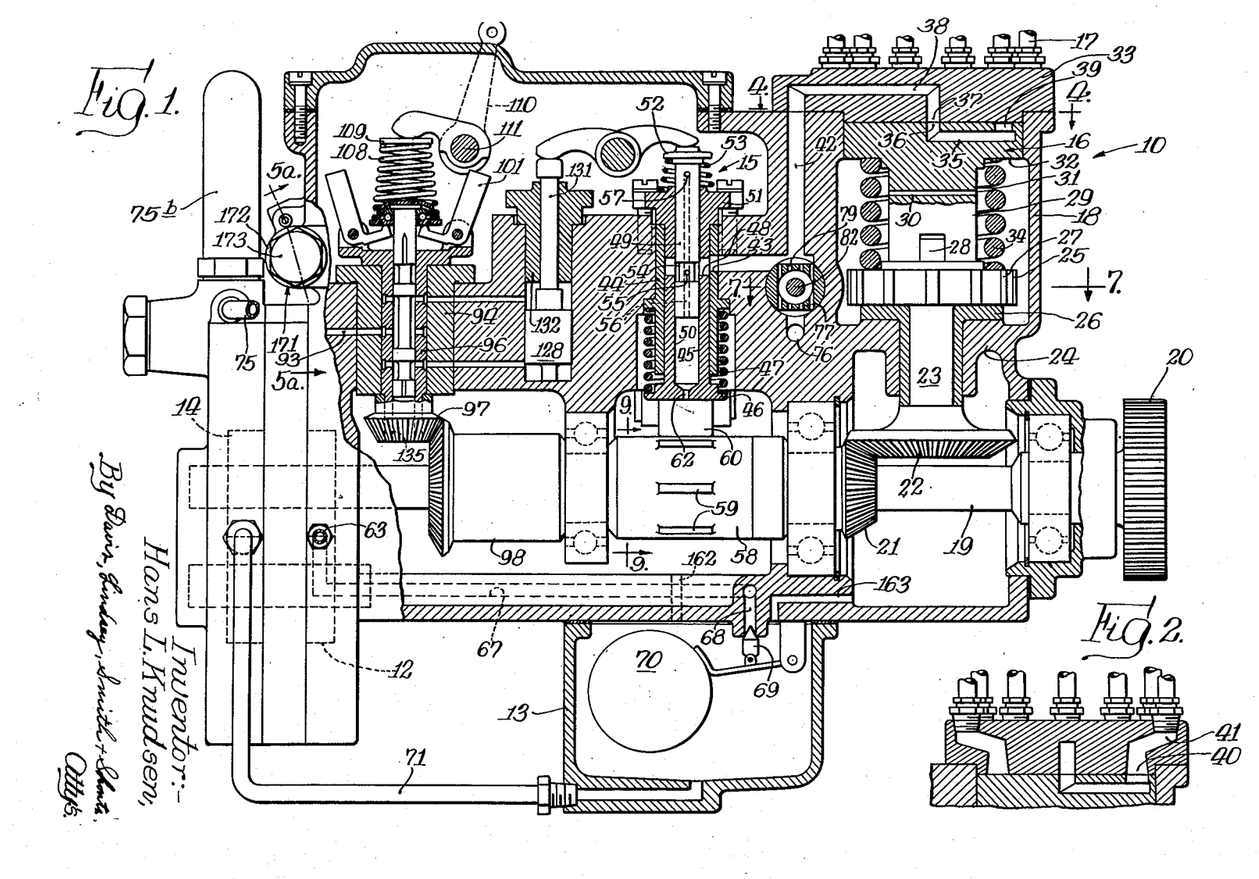
Figure 1 is a sectional elevation of my improved apparatus as taken along the line 1—1 in Fig. 3, the throttle valve and governing mechanism being shown in the positions which they assume when the engine is slowing down or coming to a stop.
Fig. 2 is a fragmentary, sectional elevation of the distributing mechanism showing the registration of one of the several ports for connecting the fuel pump piston to one of the injector lines.
Figure 10:
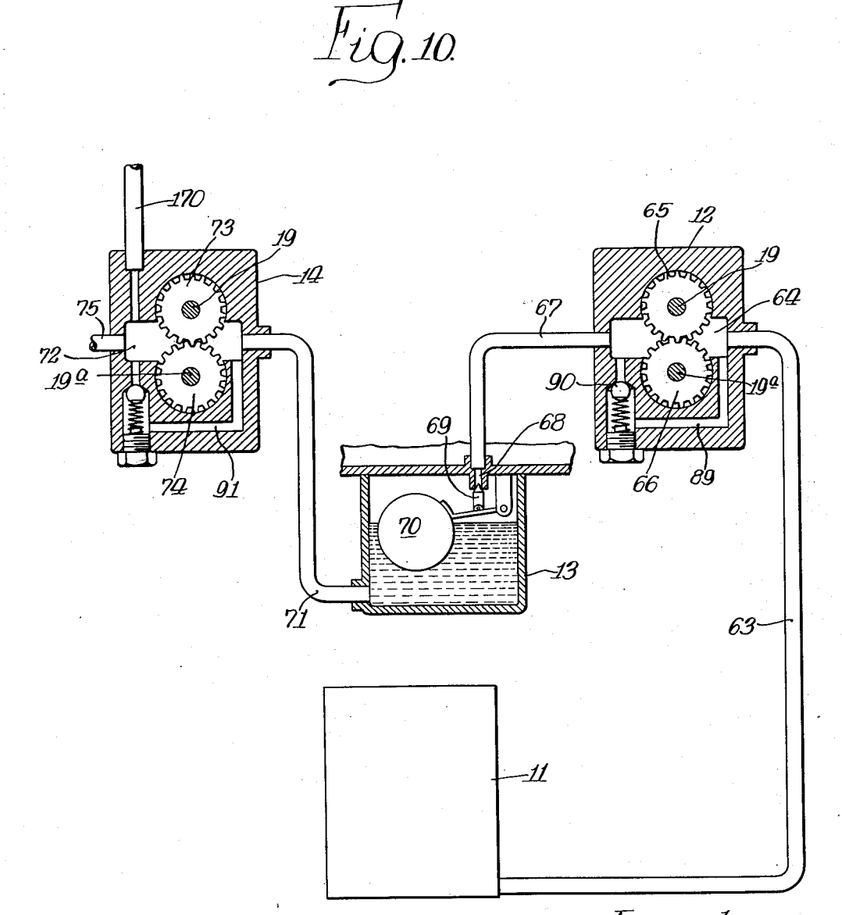
Fig. 10 is a diagrammatic, sectional view of the pump which withdraws fuel from the main fuel tank, the charging pump for establishing a fuel pressure in the line leading to the fuel metering pump, and the float or auxiliary fuel chamber, these parts being shown in displaced relation to more particularly illustrate their operative relation.

Referring to the drawings and more particularly to Figs. 1 and 10, the numeral 10 designates my improved apparatus which is intended for use with a multi-cylinder, two- or four-cycle engine of the diesel type. In the present instance, a twelve-cylinder, four-cycle engine is shown to illustrate the invention. In general outline, the fuel is withdrawn from a main tank 11 by a gear pump 12 and discharged into an auxiliary fuel tank in the form of a float chamber 13. From this float chamber the fuel is pumped by a second gear pump 14, denoted as the charging pump, which places a predetermined, minimum pressure on the fuel and delivers it to a fuel metering pump 15 which, in turn, discharges the fuel in quantities, as measured and determined by a throttle valve hereinafter described, to a distributing and phasing mechanism 16 which controls the final delivery of the charges to the individual injector line 17 leading to a characteristic injector (not shown) of the type described in United States Letters Patent No. 2,190,015.

Referring to Fig. 1, which illustrates the major structural features of my improved apparatus, the numeral 18 designates an enclosing housing having journaled in the lower portion thereof a combination cam and driving shaft 19, one end of which projects without the housing and has affixed thereto a driving member 20. It will be understood that the member 20 is so driven from the engine crankshaft (not shown) that the shaft 19 rotates at crankshaft speed when used with a four-cycle engine.

Within the housing, a bevel pinion 21 is secured to the shaft 19 and meshes with a bevel gear 22 that is fast on the lower end of a shaft 23 which extends upward through a wall 24 provided in the housing and at its upper end is secured to a cam disk 25 that rides on the upper surface of a flanged bushing 26 within which the shaft 23 is journaled. The peripheral surface of the disk 25 is provided with twelve equi-spaced cam lobes 27 for a purpose presently explained. The speed ratio between the pinion 21 and gear 22 is 2:1, so that the cam disk 25 makes one complete revolution during two revolutions of the cam shaft 19 and the engine crankshaft.

A driving lug 28 projects upward from the disk 25 and fits within a correspondingly shaped slot provided in a connector 29 whose upper end includes a slot 30 for receiving a driving lug 31 that projects from a rotary disk 32 which constitutes the movable member of the distributing and phasing mechanism 16. Preferably, the driving lugs 28 and 31 are diametrically related with respect to the disks 25 and 32, respectively, and are arranged at right angles with respect to each other so that a universal-like connection is thereby established between the disks. The top surface of the disk 32 is flat and bears against a flat surface provided on the underside of a distributor head 33 that is secured to the housing 18. The coacting surfaces of the disk 32 and head 33 are maintained in contact by a helical spring 34 which encircles the connector 29, the lower end of the spring abuting against the cam disk 25 and the upper end against the underside of the distributor disk 32.

Figures 3, 4, 5, 5A:
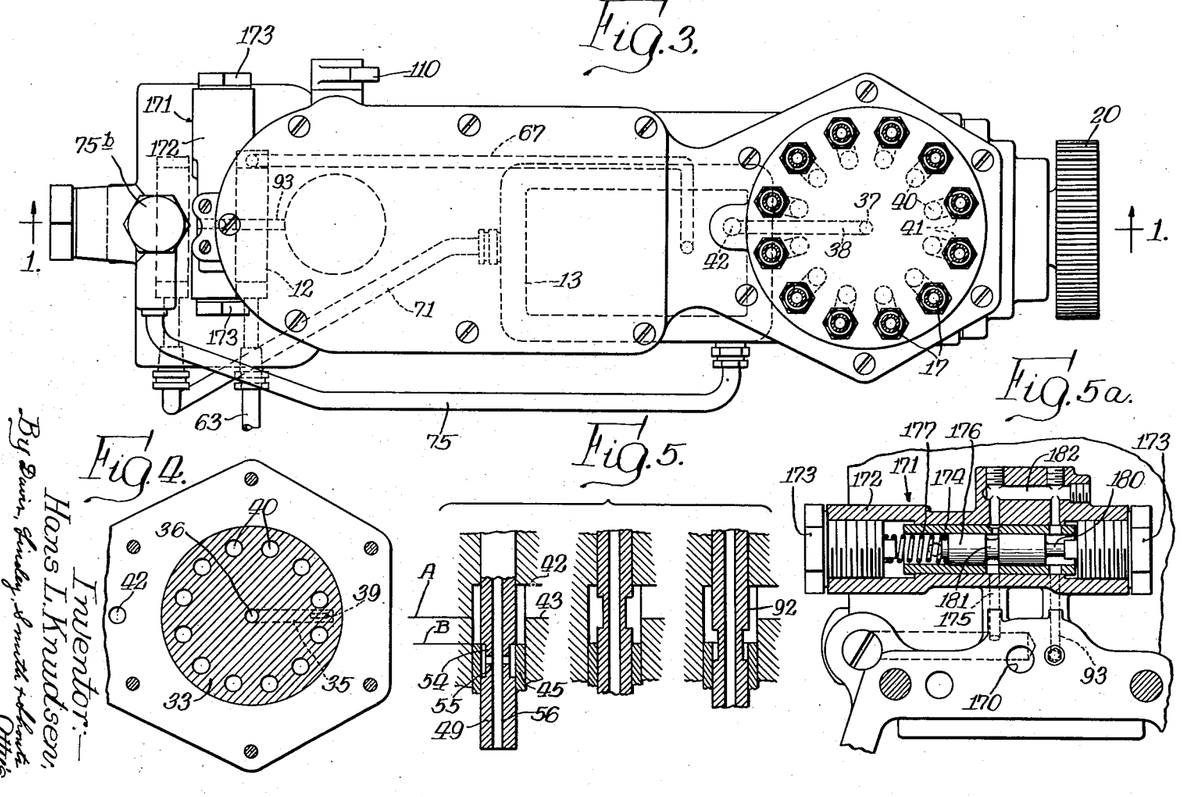
Fig. 3 is a plan view of the apparatus, looking in the direction of the arrow 3 in Fig. 1.
Fig. 4 is a section taken along the line 4—4 in Fig. 1, showing a portion of the distributing mechanism.
Fig. 5 is a diagrammatic, sectional view showing the relation of the throttle valve and fuel pump piston when the engine is operating with a fully open, fully closed, or partially closed throttle.
Fig. 5a is a fragmentary, sectional view taken substantially on the line 5a—5a of Fig. 1.

The distributor disk 32 is provided with a U-shaped, radial passage 35 whose inlet port 36 is coaxial with the disk 32 and is in constant registration with the delivery port 37 that terminates a passage 38 formed in the head 33. The delivery port 39 of the passage 35 is also located in the upper surface of the disk 32 and its radial distance from the axis of the disk is such that it registers in succession during the rotation of the disk 32 with outlet ports 40, each of which constitutes a part of a delivery passage 41 that communicates with an injector line 17.

The delivery passage 38 is continued as a passage 42 which is provided in the housing wall 24 and it terminates in a port 43 formed in a bushing 44 that is mounted in a bore in the wall 24. The port 43 constitutes an inlet port for the passage 42 and also a delivery port for the fuel pump chamber presently described.

A constant stroke, sleeve piston 45 is reciprocable in the bushing 44 and its lower end is provided with an annular flange 46 against which seats the lower end of a helical spring 47 which encircles the piston, the upper end of the spring bearing against an annular flange provided on the bushing 44. The spring 47 constantly urges the piston 45 to its lowermost position and the relationship is so designed that its upper end 48 at its uppermost position is substantially flush with the lower edge of the port 43. The position of the piston in Fig. 1 is the lowermost position. This position of the piston therefore coincides with the end of its delivery stroke, as hereinafter described.

A metering slide valve 49, hereinafter termed the throttle valve, is reciprocable within an axial bore 50 provided in the piston 45 and also within a bushing 51 that is mounted in the wall 24. The upper end of the valve 49 projects above the bushing 51 and is formed with an enlarged head 52. A helical spring 53 encircles that portion of the valve which projects above the bushing 51, the lower end of the spring abutting the bushing and the upper end the underside of the head 52. The spring 53 always tends to urge the throttle valve upward to the uppermost limiting position illustrated in Fig. 1, which, as hereinafter described, corresponds to a closed throttle position.

Adjacent to the port 48, the valve 49 may be reduced in diameter as at 54 and one or more radially disposed, bleeding ports 55 are located in the reduced portion which communicates with an axial passage 56 whose lower end terminates with the lower end of the throttle valve and the upper end with a radially disposed port 57 which in all positions of the throttle valve lies above the top surface of the bushing 51. It will be understood that the piston 45 constitutes the piston of the fuel metering pump 15 and that the pump chamber is defined by the opposed ends of the piston 45 and bushing 51, and the adjacent surfaces of the bushing 44 and throttle valve 49.

Figure 9:
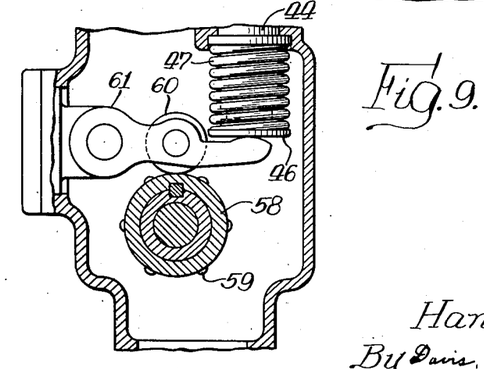
Fig. 9 is a section along the line 9—9 in Fig. 1, showing the mechanism for controlling the reciprocation of the fuel metering pump piston.

Referring to Fig. 9, the piston 45 is reciprocated in timed relation to the engine crankshaft through the medium of a cam sleeve 58 which is secured to the shaft 19 and is provided with six equi-spaced cam lobes 59 which periodically contact a roller 60 that is mounted on an intermediate portion of a rock lever 61. The lever 61 is pivotally mounted in the housing 18 and its free end engages the under surface of the piston head 46, it being understood that the spring 47 constantly maintains this head in contact with the indicated end of the rock lever 61. For a purpose presently explained, the lower end of the piston bore 50 terminates in a port 62 located in the head 46, and this port serves the dual purpose of providing a by-pass for all or a portion of the fuel in the pump chamber during the delivery stroke of the piston 45 and of lubricating the under surface of the piston head to prevent undue friction with the end of the rock lever 61.

The efficient operation of internal combustion engines of the character for which the present apparatus is intended requires an accurate and controllable measuring of relatively minute charges of the liquid fuel, these charges varying from drop-like in size as a maximum to a fraction of a drop equivalent approximately to the size of a pinhead. It has been ascertained that accurate control of such small fuel charges can only be insured if the metering pump is supplied with fuel under pressure, and the instrumentality for accomplishing this purpose will now be described.

Referring to Figs. 1, 3 and 10, the fuel is withdrawn from a main tank 11 through a pipe 63, which may be provided with a check valve 63a (Fig. 16), into the pump chamber 64 by a gear pump 12 which comprises a pair of meshing gears 65 and 66, the former of which is secured to the cam shaft 19 and the latter to an offset shaft 19a that may be appropriately journaled in the housing for the pumps 12 and 14. The discharge from the pump 12 is delivered to a passage 67 and thence to a passage 68 leading into the float chamber 13 and which passage is controlled by a needle valve 69 carried by a float 70 that is pivotally mounted within the chamber 13, the parts being so arranged that, when the chamber 13 is filled, the needle valve 69 denies further delivery into the chamber.

Fuel from the chamber 13 is withdrawn through a passage 71 and delivered into the pump chamber 72 by the charging pump 14 which comprises a pair of meshing gears 73 and 74, the former of which is secured to the cam shaft 19 and the latter to the offset shaft 19a. The pump 14 establishes a pressure on the fuel delivery passage 75, which is conducted by a suitable duct to a filter 75a (Fig. 16) and a surge chamber 75b (see Figs. 1, 3 and 16) and then to a delivery passage 75, and this passage delivers the oil to a passage 76 (see Figs. 1 and 8) that is provided in the body 24 and the delivery end of this passage registers with a group of parallel ducts that extend through the wall of a sleeve 78 mounted in the body 24. The group of ducts 77 is in alignment with a similar group 79 that is also located in the wall of the sleeve 78 and in opposite relation to the duct group 77. The duct group 79 in turn communicates with the passage 42.

Figure 7:
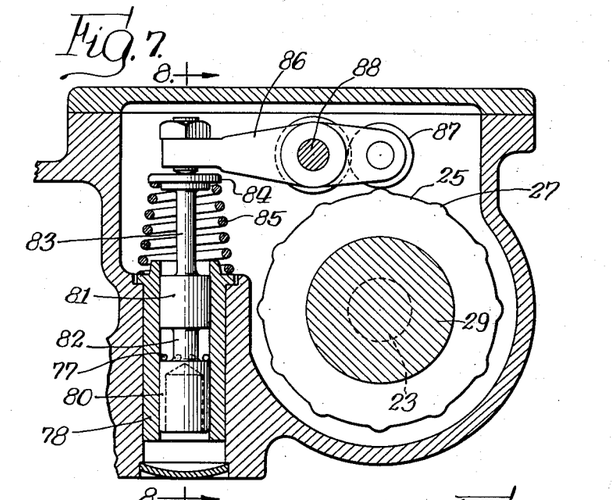
Fig. 7 is an enlarged section taken along the line 7—7 in Fig. 1, showing the piston valve which controls the delivery of fuel under pressure to the fuel metering pump chamber.
Figure 8:
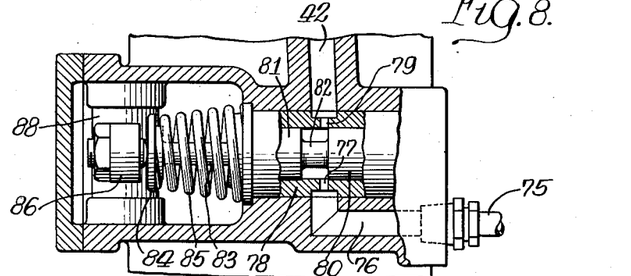
Fig. 8 is a section along the line 8—8 in Fig. 7.

Communication between the duct groups is controlled by a piston valve 80 that is reciprocable within the sleeve 78 and which also comprises a guide portion 81 that is separated from the piston valve by a neck 82 having a reduced diameter relative to that of the piston valve, so that, when the valve occupies the position illustrated in Figs. 7 and 8, fuel under pressure may flow directly to the chamber of the metering pump, but, when shifted toward the left, as viewed in Fig. 8, the delivery ends of the ducts in the group 77 are completely masked. The piston guide portion 81 is provided with an outwardly extending stem 83 having a head 84 and contacting one side of this head is a helical spring 85 which encircles the stem 83 and has its opposite end bearing against the adjacent end of the sleeve 78. The spring 85 always tends to urge the piston valve in a direction masking the ducts 77 and 79. Movement of the valve in the opposite direction is effected by one arm of a lever 86 which constantly bears against the head 84, while the other arm is provided with a roller 87 that bears against the periphery of the cam disk 25 and periodically against the lobes 27 on this disk. The intermediate portion of the lever 86 is pivoted on a shaft 88 whose ends may be appropriately journaled in the housing 18.

From the foregoing, it will be understood that, during two revolutions of the cam shaft 19, corresponding to two revolutions of the engine crank shaft and therefore a delivery of a fuel charge to each of the injector lines, the piston valve 80 is reciprocated twelve times by the cam lobes 27, the parts being so timed that, when the piston valve 80 occupies the position shown in Figs. 7 and 8 with a consequent delivery of fuel under pressure to the chamber of the metering pump, the delivery port 39 in the distributor disk 32 is masked by a portion of the stationary distributor head 33 between a pair of successive ports 40. Conversely, during periods of delivery by the metering piston 45, the piston valve 80 will be moved to a position masking the duct groups 77 and 79 and the distributor port 39 will register with one of the distributor ports 40 in the stationary head 33.

Referring to Fig. 10, whenever a sufficient amount of fuel has been collected in the float chamber 13 to cause the needle valve 69 to close the passage 68, provision is made for by-passing the fuel within the gear pump 12 through a passage 89 which connects the inlet and discharge sides of the pump, and located in this passage at some convenient point is a spring actuated pressure control valve 90. A similar by-pass arrangement denoted generally by the numeral 91 may be provided in the charging pump 14. The relation between the gear pump 12, the charging pump 14 and float chamber 13, as illustrated in Fig. 10, is substantially identical with that disclosed and claimed in United States Letters Patent No. 2,056,259, dated October 6, 1936, and the operation of this portion of the apparatus is such that the passages 42, 38 and 35 are continuously filled with fuel under pressure.

In the operation of the apparatus so far described, a predetermined pressure is maintained in the passage 42 by the charging pump, as permitted by the reciprocation of the piston valve 80. As already described, the supply of fuel under pressure into the passage 42 periodically occurs during times when the delivery port 39 of the distributing mechanism is masked by the stationary head 33 and also while the metering piston 45 is being retracted to its lowermost position illustrated in Fig. 1. During times when the piston valve 80 is masking the ducts 77 and 79, the metering piston 45 expels a measured charge of fuel through the passages 43, 42, 38 and 35 to one of the injector lines 17. Since the metering piston 45 is characterized by a constant stroke, variation in the sizes of the fuel charges can only be effected by varying the position of the throttle valve 49 and three such relative positions of this valve and piston are diagrammatically illustrated in Fig. 5.

Referring to the last-noted figure, the intermediate view shows a relation of the indicated parts corresponding to that illustrated in Fig. 1, i. e., a fully closed throttle, whereas the left-hand view shows relative positions for a fully open throttle and the right-hand view illustrates conditions of partially open throttle. The distance between the lines A and B is intended to represent diagrammatically the full stroke of the metering piston 45.

In the intermediate view in Fig. 5 it will be observed that the throttle valve 49 has been moved to a position in which the bleeding ports 55 cannot be masked by the piston 45. Accordingly, during this stroke, fuel in the pump chamber will be by-passed through the ports 55 into the passage 56 and thus will be drained through the piston bore 50 and port 57 to the bottom of the housing 18, since each injector line at some point is provided with one or more check valves (not shown) of the spring type and the pressure required to open such valve or valves is substantially greater than that required to cause flow through the ports 55. Therefore, with the valve 49 in the position indicated, no fuel charges will be delivered to the injector lines and this position thus corresponds to a fully closed position of the engine throttle.

In the left-hand view in Fig. 5, the throttle valve 49 occupies its lowermost position, namely, one in which the ports 55 are completely masked by the piston 45 at the beginning of its delivery stroke, thus preventing by-passing of any fuel from the pump chamber into the passage 56 during the upstroke of the metering piston. So long as the throttle valve occupies this fully opened position, the piston delivers equal and measured charges of maximum size to the several injector lines.

In the right-hand view in Fig. 5, the throttle valve occupies a position in which the ports 55 are in an intermediate position between the limiting positions illustrated in the left-hand and intermediate views of the same figure. Therefore, as the piston 45 moves upward on its delivery stroke, some of the fuel in the pump chamber will be by-passed through the ports 55 until these ports have been completely masked by the moving piston. Thereafter, the amount of fuel remaining in the pump chamber above the annular shoulder 92 will be discharged into one of the several injector lines. This position of the valve 49 corresponds to a partially open position of the engine throttle. Variations in the amount of fuel discharged can, of course, be effected by positioning the throttle valve 49 between any of the limiting positions illustrated in the left-hand and intermediate views in Fig. 5 and, in all cases, when the ports 55 are occupying some intermediate position between the possible limiting positions of these ports, the amount of fuel discharged through the injector lines will be a function of the distance traveled by the piston after completely masking these ports. It will be understood, of course, that, due to the reduced valve portion 54, complete masking of the ports 55 can never occur until after the upper end of the metering piston passes the annular shoulder 92.

Position adjustments of the throttle valve 49 can be accomplished in a variety of ways, but, in the present instance, it is proposed to accomplish this result by a hydraulic, isochronous governing device wherein the hydraulic pressure is derived from the fuel pressure established by the charging pump. Four modifications of the hydraulic governing mechanism will be presently described, and attention will first be directed to that illustrated in Figs. 1 and 6.

Figure 16:
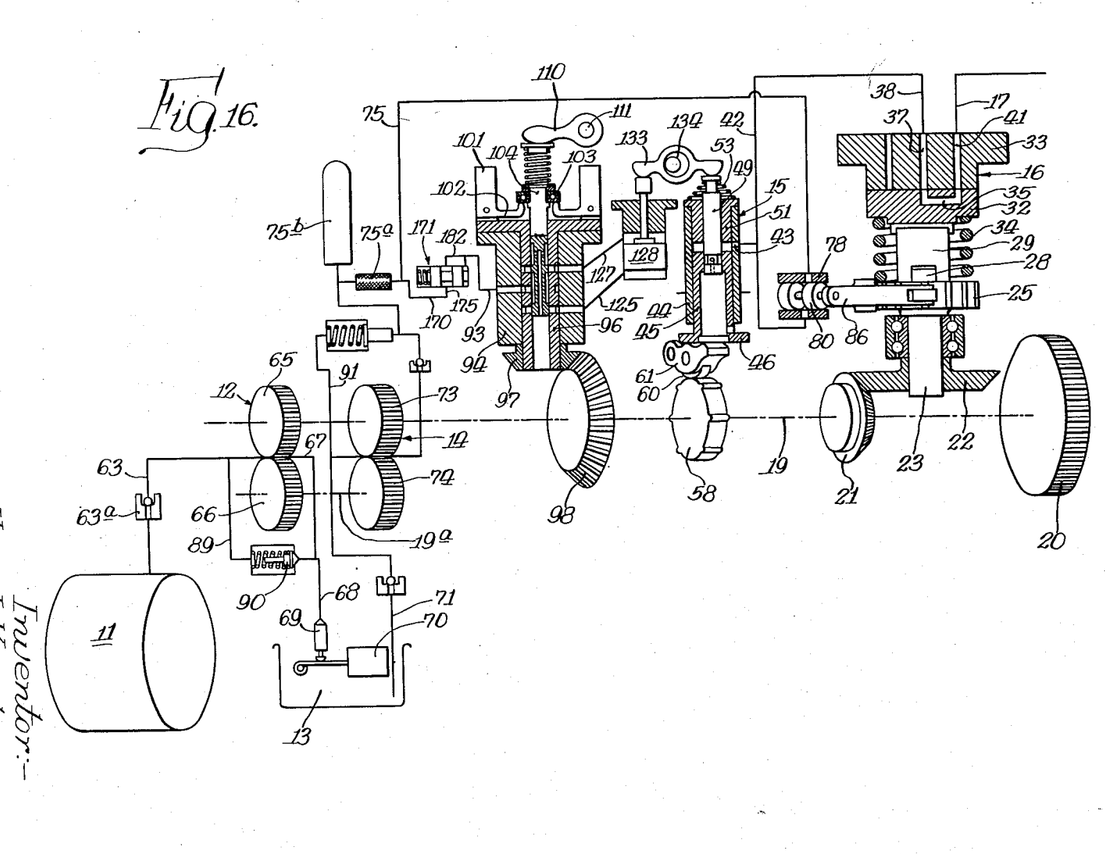
Fig. 16 is a diagrammatic view of the complete fuel feeding apparatus disclosed herein.

Referring to Figs. 1, 5a and 16, fuel under pressure for the governing device is delivered by the charging pump 14, after passing through the filter 75a, to a duct 170 leading to a pressure control or regulating valve indicated generally at 171. The pressure of the fuel delivered by the gear pump 14, of course, varies over quite a wide range because of the variations in engine speed. Furthermore, minor fluctuations in pressure of the fuel occur because of the intermittent admission of fuel through the slide valve 80. It has been found, however, that the hydraulic governor functions best if the fuel is supplied thereto under a constant pressure. For these reasons, the pressure control valve 171 is provided.

In the embodiment herein shown, the pressure control valve 171 comprises an open end casing 172 formed integrally with the body 24. The ends of the casing 172 are closed by plugs 173, while fixedly mounted within the casing is a sleeve 174. The casing 172 and the sleeve 174 are provided with registering ducts 175 communicating with the duct 170. Within the sleeve 174 is a piston valve 176 normally held at one end of the sleeve by a spring 177, a stop 180 being provided on the valve 176 adapted to abut the adjacent plug 173 to limit movement of the valve in that direction. The valve 176 intermediate its ends has a reduced portion 181 normally aligned with duct 175 so that fuel may flow transversely across the interior of the sleeve 174 to one end of a U-shaped duct 182 provided in the casing 172 with corresponding openings through the sleeve 174. The other end of the duct 183 re-enters the sleeve 174 beyond the end of the valve 176 so that fuel may flow therefrom to the governor through a passage 93.

In operation of the pressure control 171, when the fuel supplied through the duct 170 is at the desired pressure, such pressure acts equally in both directions on the valve 176 in the space about the reduced portion 181. The pressure of the fuel, however, when it enters the space about the stop 180 acts against the spring 177, and the strength of the spring is such as to balance the effect of this pressure, when the pressure is that desired for operation of the governor. Should the pressure of the fuel delivered by the charging pump 14 exceed such desired pressure, the valve 176 will be forced to the left, as viewed in Fig. 5a, compressing the spring 177 and reducing the effective opening of the duct 175 into the space about the reduced portion 181, thereby reducing the flow of fuel and the pressure existing in the passage 93. In practice, it is found that this construction provides a substantially constant pressure for the fuel delivered to the governor.

The passage 93 extends through the body wall 24 and through a bushing 94 that is mounted in the wall, the end of this passage being in constant communication with an annular channel 95 provided around the periphery of a sleeve 96 that is journaled in the bushing. The lower end of the sleeve carries a bevel gear 97 that meshes with a bevel pinion 98 fast on the cam shaft 19, thus providing for the rotation of the sleeve 96 at a fixed speed ratio to the cam shaft.

The channel 95 communicates through a plurality of radial ports 99 with an axial bore 100 provided in the sleeve 96. The upper end of the sleeve 96 is flanged and pivotally mounted thereon is a plurality of weight members 101, each of which is provided with an arm 102 that extends radially inward toward the axis of the sleeve. The inner ends of the arms 102 always bear against the lower race of a thrust bearing 103 that encircles the upper end of a piston valve 104 which is reciprocable within the sleeve bore 100. The upper race of the thrust bearing 103 rides against the under side of an enlarged head 105 formed on the piston valve 104. A saddle 106 is secured to the valve head 105 in partially enclosing relation to the thrust bearing 103 and is provided with an annular ring 107 that serves as a base for the lower end of a helical loading spring 108 whose upper end carries a cap 109. Variations in the compression of the spring 108 are accomplished by a governor lever 110 which is secured to a rock shaft 111 that is journaled in the housing 18. One arm of the lever 110 bears against the spring cap 109 while the other arm is located externally of the casing for actuation in any approved manner.

The piston valve 104 is provided with a pair of spaced valve heads 112 and 113 which sealingly fit the bore 100 and are connected by a neck 114 having a diameter reduced relative to that of the bore so as to provide therewith an annular space 100ª which, in all positions of the valve, is filled with fuel under pressure. The rotary sleeve 96 is provided with an annular channel 115 disposed above the channel 95 and communicating with the bore 100 by means of a plurality of radial ports 116. A similar channel 117 and similar ports 118 are located in the sleeve 96 below the channel 95, the axial spacing of the ports 116 and 118 being equal to the spacing of the valve heads 112 and 113 for a purpose presently explained.

A neck 119, similar to the neck 114, connects the valve head 112 with a plurality of circumferentially spaced axially extending guide ribs 121 that serve to guide the piston valve 104 during its reciprocating movement in the sleeve bore 100 and which are separated from each other by drain channels 120 for a purpose presently explained. Similar drain channels 122 alternately arranged with similar guide ribs 123 are formed at the lower end of the piston valve and these ribs are connected with the valve head 113 by a neck 124.

The channel 117 is in constant communication by means of a passage 125 with the lower end of a cylinder bore 126 that is formed in the body wall 24. Similarly, the channel 115 is in constant communication with the upper end of the same cylinder bore through a passage 127. Reciprocably mounted within the cylinder bore 126 is a piston 128 from the lower end of which projects a stop 129 that is intended to engage the lower end of the cylinder bore and from the upper end of the piston extends a stop sleeve 130 that surrounds the piston rod 131. The piston rod extends upward through a plug 132 and upward movement of the piston 128 is limited by engagement of the sleeve 130 with the lower end of this plug. The piston rod extends completely through the plug 132 for engagement with one arm of a rock lever 133 that is secured to a rock shaft 134 appropriately journaled in the housing wall. The other arm of the lever 133 bears against the upper end of the throttle valve 49. It will be understood that the length of the piston 128 is such in relation to the stops 129 and 130 that it never masks the delivery ends of the passages 125 and 127, the piston 128 being shown in its uppermost position in Fig. 6 and its lowermost position in Fig. 1.

In describing the operation of the governing mechanism just described, attention will first be directed to Fig. 1 of the drawings. In this figure, it will be noted that the governor lever 110 has been rocked in a clockwise direction to substantially remove all pressure from the governor spring 108 and thus permit the weight members 101 to move to their outermost position. This movement raises the piston valve 104 so that the valve heads 112 and 113 are located above the ports 116 and 118, respectively. Fuel under pressure will, therefore, become effective against the upper end of the piston 128 and will thus move the piston to its lowermost position, which is the closed throttle position. During this movement of the piston, fuel in the lower end of the cylinder 126 will be relieved through the passage 125, channel 117 and ports 118 and thence through the drain passages 122 to the passage 135 provided in the bevel gear 97, from which the fuel drips to the bottom of the apparatus housing.

If now it is desired to provide for a full throttle opening at some determined and governed engine speed, the governor lever 110 is rocked counterclockwise to load the spring 108 and the extent of this loading will depend upon the speed at which it is desired to govern the engine. This loading of the spring effects a downward movement of the piston valve 104 to substantially the position illustrated in Fig. 6, or one in which the valve heads 112 and 113 are located below the ports 116 and 118, respectively. Fuel under pressure is then admitted to the lower end of the cylinder 126, thus driving the piston 128 to its upper limiting position as determined by the sleeve 130 and expelling the necessary amount of oil from the upper end of the cylinder 126 through the passage 127, port 116, and drain passages 120. The upward movement of the piston 128 rocks the lever 133 and shifts the throttle valve 49 to the fully open position illustrated in Fig. 6.

Thereafter, for the particular loading of the spring 108, the governor controls the speed of the engine. With an increase in engine speed, such as may be caused by a reduction in load, the piston valve may move upwardly to and including a position in which the valve heads 112 and 113 completely mask the ports 116 and 118, respectively, without changing the position of the valve 49. A further reduction in engine speed would result in the valve 49 beginning to move upward from the position shown in Fig. 6. Therefore, as the engine may vary in speed at the governed setting, the piston valve will float endwise in the bore 100. Variations in engine speed may be readily effected by varying the loading on the spring 108 through the governor lever 110. Accordingly, the arrangement shown in Figs. 1 and 6 enables the speed of the engine to be adjusted as desired while still retaining isochronous governor control at each setting of the governor lever. My improved governing device possesses the characteristics of an isochronous governor, since the piston valve 104 always tends to seek a position in which valve heads 112 and 113 cover their respective ports 116 and 118. The slightest speed variation will apply pressure either on top or bottom of piston 128 according to whether there is an increase or decrease in engine speed and the tendency for piston 128, therefore, is to float in any position demanded by the engine load and at a constant engine speed since piston valve 104 always reverts to substantially the same position.

Figure 6:
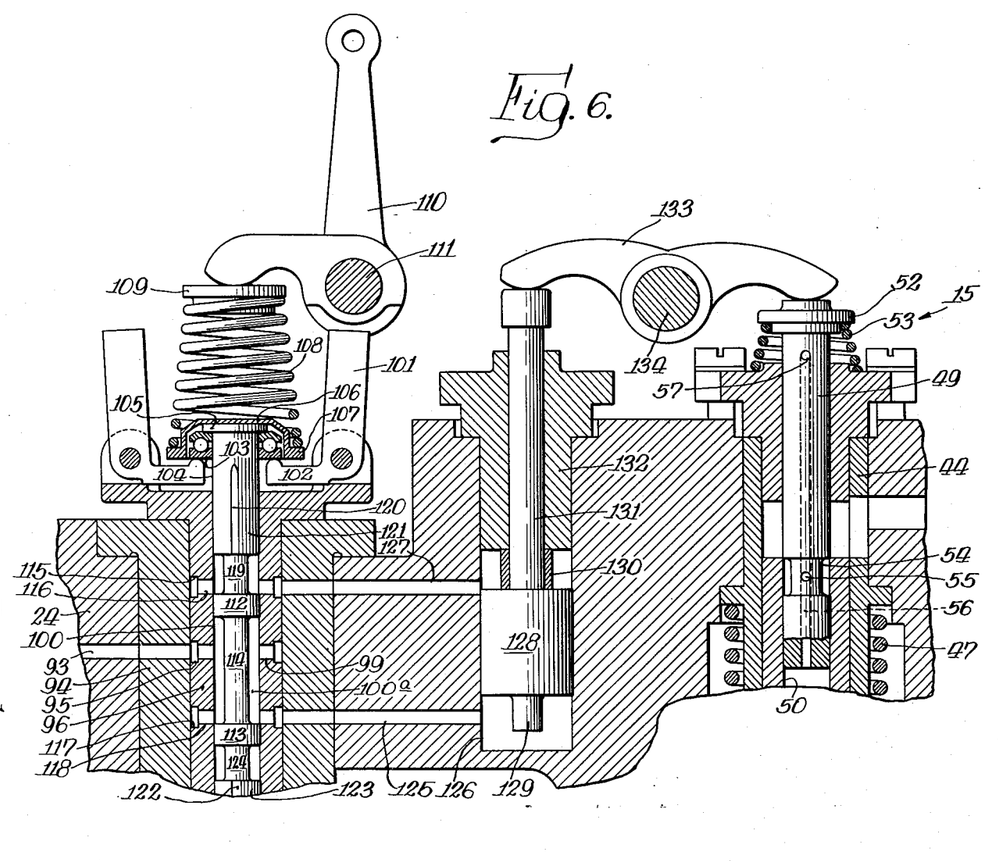
Fig. 6 is an enlarged, fragmentary sectional elevation of the apparatus, as viewed in Fig. 1, but showing the governor mechanism adjusted to insure a fully open throttle.

The starting of the engine is accomplished merely by rocking the governor lever to some position such as is illustrated in Fig. 6 in order to secure an opening of the throttle valve, while stopping of the engine is effected merely by shifting the governor lever to the position illustrated in Fig. 1. This lever movement removes the pressure from the governor spring 108 and thus permits the weight members 101 under the impulse of centrifugal force to lift the piston valve to the position illustrated in Fig. 1. Thereupon, the piston 128 is moved downward to the position shown in the last-noted figure and the throttle valve 49 is raised by the spring 53 to the closed throttle position.

It will be understood that, owing to the constant stroke of the piston 128 and the fixed relation of the arms of the lever 133, any upward movement of the piston 128 effects a constant movement of the throttle valve 49 in an opening direction, but the capacity of the weight members 101 to move outward at any particular speed is controlled by the pressure exerted on these members by the compression of the spring 108. Accordingly a relatively high compression of the spring 108 will necessitate a higher engine speed to rock the weight members 101 outward than would a lighter loading of the spring. A governor of the foregoing type is particularly useful for variable speed engines of divers applications. Drainage accumulation in the bottom of the housing 18 may be returned to the float chamber 13 through passages 162 and 163.

Figure 11:
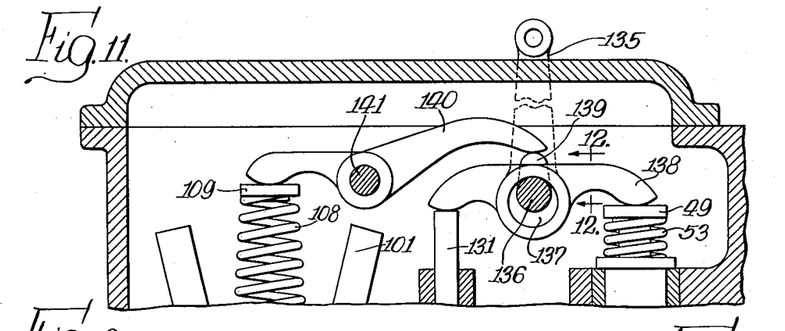
Fig. 11 is a schematic, sectional elevation of a modified type of governor control in which the governor assumes speed control of the engine at any throttle setting within the idle to full speed throttle positions and progressively lowers the top speed after the throttle moves toward idling position.

In Fig. 11 is illustrated a modified governor mechanism in which the governor exercises control at all throttle settings of the engine, in such a manner that the engine will maintain a constant speed at all throttle settings; but the speed will decrease as the throttle is moved toward closing position, and vice versa.

To this end, a throttle control lever 135 is externally mounted on one end of a rock shaft 136 that is suitably journaled in the housing 18 and interiorly of the housing this shaft is provided with an eccentric 137 on which is journaled an intermediate portion of a rock lever 138. One arm of this lever bears against the upper end of the throttle valve 49 while the other arm bears against the upper end of the governor piston rod 131. Also formed on the shaft 136 and axially spaced from the eccentric 137 is a cam 139. Preferably, the high point of the eccentric and cam are located approximately 90 degrees apart. One arm of a speed control lever 140 rides on the periphery of the cam 139 and this lever is intermediately pivoted on a rock shaft 141 whose ends are journaled in the housing 18, while the other arm of the lever bears against the spring cap 109. The remaining portion of the governor mechanism for this modification and others presently described is the same as that illustrated in Figs. 1 and 6.

When the parts occupy the position illustrated in Fig. 11, it will be obvious that, since the arm of the lever 140 is in contact with the high point of the cam 139, the spring 108 will be loaded to the maximum extent, so that the piston valve 104 and the weight members 101 will occupy the positions generally as shown in Fig. 6 and the lever 138 will accordingly be rocked to open the throttle valve 49 to the maximum extent. The governing device is then set to control the maximum speed of the engine. However, if the lever 135 is rotated in a counterclockwise direction through an angle of approximately 90 degrees, the indicated arm of the lever 140 will then ride on the low point of the cam 139, thus diminishing the load on the spring 108 to a point corresponding with the idling speed of the engine. This reduction in the compression of the spring 108 is accompanied, for reasons already noted in connection with Figs. 1 and 6, by a movement of the piston 128 to its lowermost position and, hence, a corresponding movement of the piston rod 131. The upper end of this rod acts as a fulcrum on which the lever 138 swings due to the action of the eccentric 137. It will be obvious, therefore, that this rocking of the lever 138 effects a corresponding change in position of the throttle valve 49 from that which it occupied when the parts were in the several positions illustrated in Fig. 11. The amount of fuel discharged by the metering pump will therefore vary with the positions assumed by the throttle lever 135 between the limiting positions in which the arm of the lever 140 rides on the high and low points of the cam 139. With this arrangement, therefore, it is possible to provide for throttle control of the engine between the maximum and idling speeds thereof, but, when either of these speeds are reached, as well as in intermediate throttle positions, the governor steps in and takes predominant control. A construction of this type is desirable under conditions requiring manual throttle control, as well as governor control, between the maximum and minimum speeds of the engines, such as for motor trucks and locomotives.

Figures 12, 13, 14:
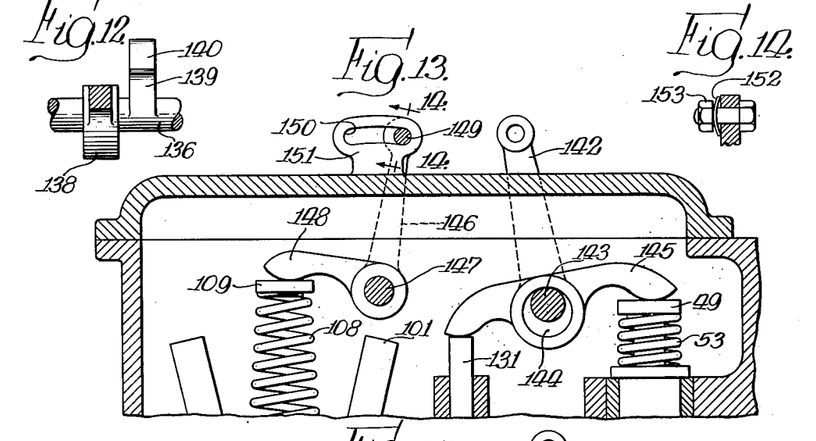
Fig. 12 is a fragmentary section, taken along the line 12—12 in Fig. 11.
Fig. 13 is a schematic, sectional elevation of a still further modified arrangement of the governor control in which provision is made for holding the governor speed control lever in any determined position within its range of movement.
Fig. 14 is a section along the line 14—14 in Fig. 13 showing a suggested arrangement for maintaining the governor lever in adjusted position.

In Fig. 13 is illustrated a still further modification of my improved governor device which is more particularly intended for generator drives or other installations requiring constant speed.

A start-and-stop lever 142 is secured externally of the housing 18 to a rock shaft 143 that is journaled in the wall of the housing, and interiorly of the latter an eccentric 144 is secured to the shaft. A lever 145 is journaled on the eccentric, one arm of the lever bearing against the upper end of the throttle valve 49 and the other lever arm against the end of the governor piston rod 131. A governor lever 146 is also mounted externally of the housing 18 to a rock shaft 147 which is journaled in the housing, and within the latter an arm 148 is secured to the shaft 147 for the purpose of engaging the spring cap 109.

In the relation of the parts shown in the figure, the governor lever 146 is rocked to a position in which substantially no pressure is exerted against the governor spring 108, thus permitting the governor piston 128 to occupy its lowermost position as heretofore explained in connection with the governing device illustrated in Figs. 1 and 6. The start-and-stop lever 142 occupies the rocked position illustrated in the figure, or one in which the lever 145 has been rotated in a counterclockwise direction sufficient to enable the spring 53 to retract the throttle valve to a position of full closure. This position corresponds to the position of the valve illustrated in Fig. 1, so that the engine is at rest.

With this modification, it is contemplated that the governor spring 108 will be loaded to secure some controlled speed of the engine and to this end provision is made for holding the governor lever 146 in any desired position within its range of movement. For this purpose, a cap screw 149 extends through the end of the governor lever and through an arcuate slot 150 provided in a quadrant 151 that forms a part of the housing 18. A friction washer 152 may be gripped against the surface of the quadrant by means of a nut 153, it being understood that this manner of securing the governor lever in any adjusted position is intended to generically illustrate any conventional means for accomplishing the indicated purpose.

The purpose of the lever 142 is to start and stop the engine and, in connection with the former operation, it is merely necessary to rock the lever 142 in a clockwise direction to secure the desired opening of the throttle valve 49. When the governor lever 146 set in an adjusted position so that the spring 108 is loaded to the desired extent, the engine will run at the required constant speed under the control of the governor. When it is desired to stop the engine, the throttle lever 142 is moved counterclockwise as illustrated in Fig. 13, thus causing the throttle valve 49 to move to its no fuel or stop position, the governor piston rod 131 acting as a fulcrum for lever 145.

Figure 15:
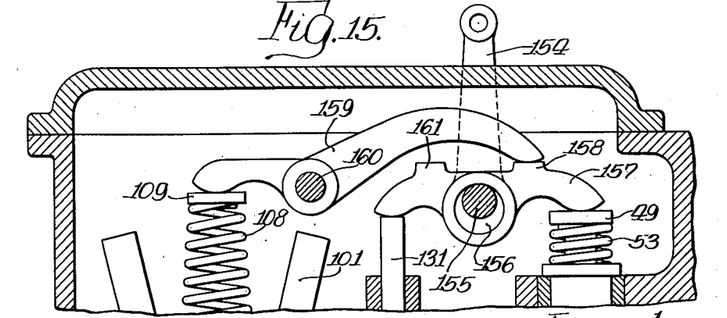
Fig. 15 is a further sectional elevation of a governor control having speed droop characteristics.

In Fig. 15, there is illustrated a further modification of the governor mechanism which is also of the constant speed type, but arranged to provide for a speed droop so that this isochronous type of governor will function like an ordinary mechanical governor.

A start-and-stop lever 154 is mounted externally of the housing 18 on one end of a rock shaft 155, and within the housing there is secured to this shaft an eccentric 156. The intermediate portion of a lever 157 is journaled on the eccentric 156, one end of the lever engaging the upper end of the throttle valve 49, while the other lever arm contacts the end of the governor piston rod 131. The arm of the lever 157 to the right of the shaft 155, as viewed in Fig. 15, is provided with an abutment 158 against which rests an arm of a speed droop lever 159 that is intermediately secured to a rock shaft 160 whose ends may be journaled in the housing 18. The other arm of the lever 159 bears against the spring cap 109.

With this modification, the engine may be started by rocking the lever 154 in a clockwise direction to the position shown in Fig. 15, and thus, through the eccentric 156, effecting a corresponding rocking of the lever 157 and a movement of the throttle valve 49 in an opening direction. Stopping of the engine is accomplished by rocking the lever 154 in the opposite direction and, during this movement, the left-hand lever arm of the lever 157 pivots on the fulcrum provided by the upper end of the governor piston rod 131.

With the parts in the position shown in the figure, the spring 108 is loaded to move the piston valve 104 to place the piston 128 in the uppermost position shown in Fig. 6, when the engine is turned over by the starter. When the engine starts and there is no load on the engine, the weight members 101, as the speed increases, swing out, moving piston valve 104 towards top position and piston 128 toward bottom stop. If the load on the engine is increased, the speed of the engine decreases and the weight members 101 swing inward sufficiently to shift the piston valve to substantially the position illustrated in Fig. 6, followed by an upward movement of the piston 128, together with its piston rod 131. The foregoing action results in a rocking of the lever 157 in a clockwise direction and a further opening of the throttle valve 49, accompanied by, and due to the rocking of the lever 159 in a clockwise direction, a reduction in the compression of the spring 108, so that the governed speed decreases as the load increases, and vice versa. It is important in this arrangement that the torque exerted by spring 53 be stronger than that exerted by lever 159 and the governor spring 108 and that sufficient hydraulic pressure be exerted against the governor piston 128 to overcome the resultant forces of the springs 53 and 108. An arrangement of the character illustrated in Fig. 15 is particularly desirable in connection with the operation of alternators in parallel since it is possible to thereby provide a better division of the load between the different units.

It may be particularly noted that it is possible with the arrangement shown in Fig. 15 to provide for an increase in the governed speed of the engine with an increase in the load. This result may be accomplished by providing an abutment 161, similar to the abutment 158 on that arm of the lever 157 which lies to the left of the shaft 155. With the arm of the speed droop lever 159 resting on the abutment 161, it is obvious that, when the load on the engine is increased, the loading of the governor spring 108 will also be increased, because of the rocking of the lever 159 in a counterclockwise direction.

My improved apparatus renders it possible to incorporate with a fuel pump and distributing apparatus for a multicylinder internal combustion engine any one of the different forms of hydraulic isochronous governing controls hereinbefore described and to associate this control in a compact, built-in structure which also embodies the metering or fuel pump and distributing mechanism. It is contemplated that sudden movements of the governor piston 128 may be restrained by suitably proportioning the sizes of the passages 125 and 127, so that some restriction is exercized on the flow of fuel therethrough. The structure would then be characterized by a dashpot action in that the slow shifts of the piston would be freely permitted.

My improved governor control is particularly useful in installations where the critical or torsional speed of the engine is relatively close to the desired governed speed of the engine. This critical speed may be an intermediate speed within the range of engine speed, but, due to the delicate and responsive characteristics of the type of governor proposed herein, it is possible to operate close to and on either side of the critical speed of the engine.

I claim:

1. In a fuel feeding apparatus for a multi-cylinder internal combustion engine, a fuel metering pump for delivering metered quantities of fuel to the cylinders including an adjustable bleed valve for bleeding off fuel delivered by said pump, a source of fuel under pressure for supplying fuel to said pump, a hydraulic actuator operable by fuel from said source for adjusting said bleed valve, a valve for controlling the flow of fuel to said actuator, a governor adapted to be driven by the engine for operating said last-mentioned valve, said governor including weights adapted to swing outwardly on increase in engine speed and a spring resisting such outward movement, a lever connecting said actuator and said bleed valve, and a manually operable lever connected to said first-mentioned lever for manually shifting said bleed valve and having a connection for varying the resistance of said spring.

2. In a fuel feeding apparatus for a multi-cylinder internal combustion engine, a fuel metering pump for delivering metered quantities of fuel to the cylinders including an adjustable bleed valve for bleeding off fuel delivered by said pump, a source of fuel under pressure for supplying fuel to said pump, a hydraulic actuator operable by fuel from said source for adjusting said bleed valve, a valve for controlling the flow of fuel to said actuator, a governor adapted to be driven by the engine for operating said last-mentioned valve, said governor including weights adapted to swing outwardly on increase in engine speed and a spring resisting such outward movement, a lever connecting said actuator and said bleed valve, and a manually operable lever shiftable independently of said first-mentioned lever for varying the resistance of said spring.

3. In a fuel feeding apparatus for a multi-cylinder internal combustion engine, a fuel metering pump for delivering metered quantities of fuel to the cylinders including an adjustable bleed valve for bleeding off fuel delivered by said pump, a source of fuel under pressure for supplying fuel to said pump, a hydraulic actuator operable by fuel from said source for adjusting said bleed valve, a valve for controlling the flow of fuel to said actuator, a governor adapted to be driven by the engine for operating said last-mentioned valve, said governor including weights adapted to swing outwardly on increase in engine speed and a spring resisting such outward movement, a lever connecting said actuator and said bleed valve, a manually operable lever connected to said first-mentioned lever for manually shifting said bleed valve, and a second manually operable lever for varying the resistance of said spring.

4. In a fuel feeding apparatus for a multicylinder internal combustion engine, a fuel metering pump for delivering metered quantities of fuel to the cylinders including an adjustable bleed valve for bleeding off fuel delivered by said pump, a source of fuel under pressure for supplying fuel to said pump, a hydraulic actuator operable by fuel from said source for adjusting said bleed valve, a valve for controlling the flow of fuel to said actuator, a governor adapted to be driven by the engine for operating said last-mentioned valve, said governor including weights adapted to swing outwardly on increase in engine speed and a spring resisting such outward movement, a lever connecting said actuator and said bleed valve, a manually operable lever connected to said first-mentioned lever for manually shifting said bleed valve, a cam actuated by said manually operable lever, and a lever operated by said cam for varying the resistance of said spring.

5. In a fuel feeding apparatus for a multi-cylinder internal combustion engine, a fuel metering pump for delivering metered quantities of fuel to the cylinders including an adjustable bleed valve for bleeding off fuel delivered by said pump, a source of fuel under pressure for supplying fuel to said pump, a hydraulic actuator operable by fuel from said source for adjusting said bleed valve, a valve for controlling the flow of fuel to said actuator, a governor adapted to be driven by the engine for operating said last-mentioned valve, said governor including weights adapted to swing outwardly on increase in engine speed and a spring resisting such outward movement, a lever connecting said actuator and said bleed valve, a lever actuated by said first-mentioned lever for varying the resistance of said spring, and a manually operable lever connected to said first-mentioned lever for manually shifting said bleed valve.

6. In a fuel feeding apparatus for a multicylinder internal combustion engine, a fuel metering pump for delivering metered quantities of fuel to the cylinders including an adjustable bleed valve for bleeding off fuel delivered by said pump, a governor adapted to be driven by the engine including weights adapted to swing outwardly on increase in engine speed and a spring resisting such outward movement, a lever connected to said bleed valve and responsive to the action of the governor, and a manually operable lever connected to said first-mentioned lever for manually shifting said bleed valve and having a connection for varying the resistance of said spring.

7. In a fuel feeding apparatus for a multicylinder internal combustion engine, a fuel metering pump for delivering metered quantities of fuel to the cylinders including an adjustable bleed valve for bleeding off fuel delivered by said pump, a governor adapted to be driven by the engine including weights adapted to swing outwardly on increase in engine speed and a spring resisting such outward movement, a lever connected to said bleed valve and responsive to the action of the governor, and a manually operable lever shiftable independently of said first-mentioned lever for varying the resistance of said spring.

HANS L. KNUDSEN.

REFERENCES CITED

The following references are of record in the file of this patent:

UNITED STATES PATENTS

| Number | Name | Date |
|---|---|---|
| 1,292,981 | Weiss | Jan. 28, 1919 |
| 1,720,657 | Chorlton | July 16, 1929 |
| 1,968,390 | Hamilton | July 31, 1934 |
| 2,001,126 | Cummings | May 14, 1935 |
| 2,078,286 | Seagren | Apr. 27, 1937 |
| 2,001,126 | Cummings | May 14, 1935 |
| 2,252,693 | Becker | Aug. 19, 1941 |
| 2,273,670 | Udale | Feb. 17, 1942 |
| 2,364,817 | Reggio | Dec. 12, 1944 |
| 2,453,196 | Clark | Nov. 9, 1948 |

FOREIGN PATENTS

| Number | Country | Date |
|---|---|---|
| 405,803 | France | Nov. 24, 1909 |